Sept. 19, 1939.  L. S. SHELDRICK  2,173,615
VEHICLE BRAKE
Filed June 26, 1937  2 Sheets-Sheet 2

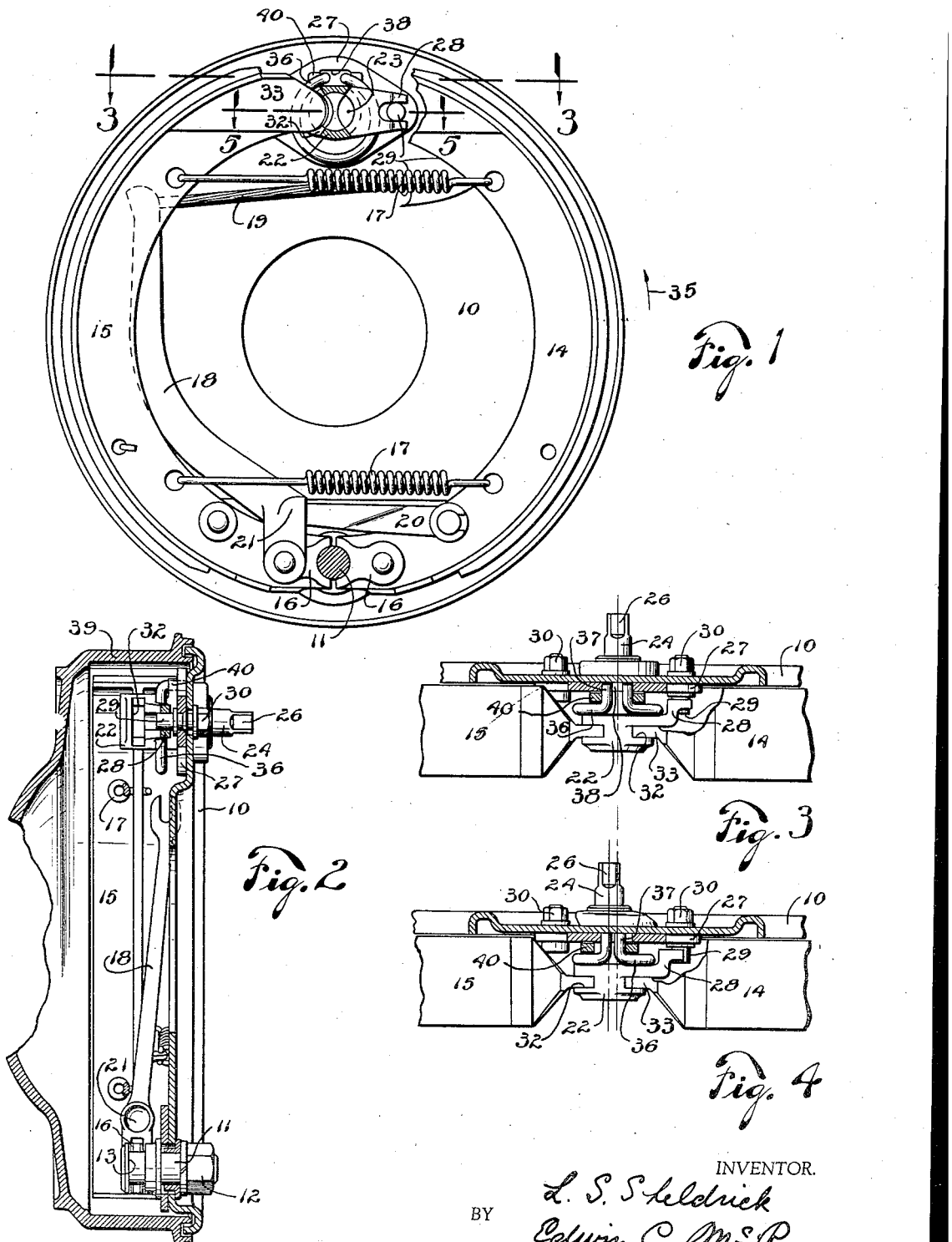

INVENTOR.
L. S. Sheldrick
Celwin C. McRae
BY
ATTORNEY.

Patented Sept. 19, 1939

2,173,615

UNITED STATES PATENT OFFICE 2,173,615

VEHICLE BRAKE

Laurence Spence Sheldrick, Dearborn, Mich., assignor to Ford Motor Company, Dearborn, Mich., a corporation of Delaware Application June 26, 1937, Serial No. 150,603

8 Claims. (Cl. 188—78)

The object of my invention is to provide a vehicle brake of the two-shoe internal expanding type, which brake is provided with means for separating one pair of adjacent shoe ends to apply the shoes to the brake drum, and which brake is provided with adjusting means disposed between the other pair of adjacent shoe ends. My improved brake is fully energized for resisting rotation of the drum in both directions. Consequently, the adjustable ends of the brake shoes must be movable bodily circumferentially in both directions from a central or neutral position. In fully energized brakes of this type, an anchor pin is invariably disposed between with the operated ends of the brake shoes so that when these ends of the shoes are separated the primary shoe pulls away from the anchor pin in the direction of rotation of the drum and applies its torsional load upon the adjustable end of the other or secondary shoe. Rotation of the secondary shoe and also the primary shoe is prevented by the anchor pin. When rotation of the drum in the opposite direction is resisted, the functions of the shoes are reversed, the first-mentioned shoe being anchored while the second-mentioned shoes moves away from the pin. It will therefore be seen that the adjustable ends of the shoes must swing circumferentially in both directions from a central or neutral position, in order to permit an energizing brake action for both directions of drum rotation.

The object of this invention therefore is to provide an adjusting device between the brake shoes which is free to move circumferentially in both directions from a central or neutral position and which will upon the release of the brakes be positively returned to the exact neutral position to thereby effect a minimum but definite clearance between the brake shoes and the brake drum. In most brakes of this type the neutral position is established by the balanced position between two oppositely extending springs. Such construction is unsatisfactory because, regardless of the stiffness of the springs, an infinitely small lateral pressure will still move the adjusting device a definite amount in one direction or the other. For this reason, even with the stiffest springs permissible, a relatively small lateral force will cause the shoes to move the .006 inch clearance space between the lining and the drum and thus cause dragging of the shoes. A positive stop cannot be provided for resisting movement of the shoes in either direction as same would prevent the energizing action. However, the applicant has provided a centering means which is designed to resist circumferential motion of the shoe ends against all pressures encountered other than the actual brake applying pressure. In the design shown a lateral pressure of approximately 40 pounds on the adjusting mechanism is required before movement thereof occurs. The amount of pressure required can be regulated by the design of the device. However, forty pounds pressure is sufficient to firmly hold the brake mechanism and shoes in a central position against any movement, due to inertia of the parts or other conditions encountered in the normal operation of the vehicle.

A further object of my invention is to provide a two shoe self energized brake for resisting rotation in both directions, which brake will have means associated therewith for lessening the energizing action produced by the primary shoe. All fully energized brakes have the disadvantage that the entire braking torque of the primary shoe is impressed upon the secondary shoe. If substantially all of the drum is used, a locking or grabbing action sometimes occurs. This may be reduced by providing a smaller wrapping angle but this lessens the efficiency and life of the brakes. The applicant reduces the pressure on the secondary shoe by causing a substantial portion of the primary shoe torque to be used in compressing a spring of redetermined resistance so that only the remaining torque is applied to the secondary shoe. This prevents grabbing of the brake without lessening the length of the shoes or resorting to the complication of a three shoe brake design.

With these and other objects in view my invention consists in the arrangement, construction and combination of the various parts of my improved device, as is described in this specification, claimed in my claims and illustrated in the accompanying drawings, in which:

Figure 1 is a plan view of my improved brake.

Figure 2 is a vertical central sectional view through the brake, shown in Figure 1.

Figure 3 is a sectional view, taken on the line 3—3 of Figure 1, showing the positions of the several parts when the brake is in its central or neutral position.

Figure 4 is a view, similar to Figure 3, showing the positions of the several parts when the brake is applied to resist rotation of the brake drum in a counterclockwise direction, referring to Figure 1.

Figure 5:
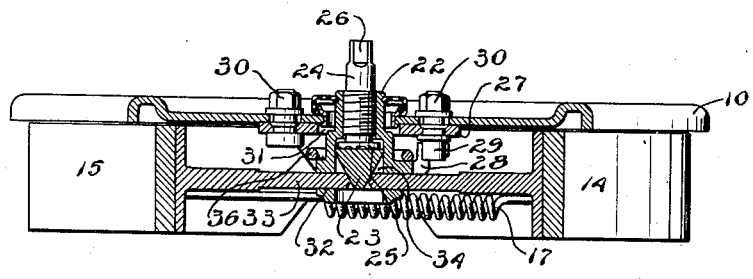
Figure 5 is a sectional view, taken on the line 5—5 of Figure 1.

Referring to the accompanying drawings, I have used the reference numeral 10 to indicate a brake anchor plate, which may be secured to either a front wheel spindle or one outer end of the rear axle housing. An anchor stud 11 is fixedly secured to the anchor plate 10 by means of a nut 12, the opening between the stud and the anchor plate being sufficiently large that a limited radial adjusting movement of the stud is permitted. An annular groove 13 is machined in the outer end of the stud 11 and brake shoes 14 and 15, respectively, have one pair of their adjacent ends anchored in the groove 13 upon opposite sides of the stud. Each shoe extends substantially half way around the brake in position to co-act with a brake drum 39. The ends of the shoes adjacent to the stud 11 are reinforced by means of plates 16 which are riveted to the webs of the shoes. The end of each plate 16 is machined with an arcuate shaped notch to fit in the groove 13 and bear against the cylindrical anchor position of the anchor stud. A pair of tension springs 17 resiliently urge the respective ends of the shoes together. An operating lever 18 is pivoted to the shoe 15 adjacent to the anchored end thereof with the free end of the lever fixed to a cable 19, which thereby applies the brake. A forked link 20 is pivotally secured to the anchored end of the shoe 14, which link extends to a socket 21 in the arm 18. Thus, when the cable 19 is tensioned, the arm 18 will be rotated clockwise in Figure 1 to thereby spread the adjacent brake shoe ends.

The brake shoe adjusting mechanism is secured to the anchor plate 10 between the upper ends of the shoes 14 and 15. This mechanism comprises a cylindrical housing 22 having a wedge block 23 slidably mounted in one end thereof for movement axially in the cylinder. An adjusting screw 24 is threaded into the other end of the cylinder and is provided with a head 25 adjacent to the wedge block 23. The outer end of the screw is squared, as shown at 26, whereby the screw may be conveniently rotated. It will be seen that rotation of the screw in one direction will push the block 23 outwardly in the sleeve.

The housing 22 is provided with an arm 28 projecting from one side thereof, which arm has a forked end which straddles a guide pin 29, which projects from the anchor plate 10. The housing 22 extends through a relatively large opening in the anchor plate, so that considerable movement of the housing relative to the anchor plate is permitted.

A plate 27 is secured to the anchor plate 10 by means of bolts 30, one of which is formed integrally with the pin 29. A relatively large opening 31 is provided in the plate 27 through which the housing 22 projects.

From the foregoing it will be seen that the housing 22 is permitted a substantial circumferential movement in both directions from a central position. A pair of diametrically opposite slots 32 are machined in the walls of the housing 22 between the arm 28 and the outer end of the housing. The webbed end portions 33 at the upper ends of the shoes extend inwardly through the slots 32 and are curved to fit a pair of arcuate tapered grooves 34 which are machined in opposite sides of the wedge block 23. The grooves 34 are arcuate in cross section in order that the shoe ends may be located vertically. When the adjusting screw 24 is turned, the wedge block is pushed inwardly to thereby spread the shoe ends 33 and bring the brake shoes closer to the brake drum.

It will be further noted that when the brake drum 39 is rotating in a counter-clockwise direction, as shown by arrow 35, and the arm 18 is moved to apply the brake, that the shoe 14 will engage the brake drum and rotate in the direction of arrow 35, thereby impressing its torque upon the wedge block 23. As this wedge block is relatively free to move circumferentially, being resisted only by a spring later to be described, the braking torque is transmitted through the wedge block to the adjacent end of the shoe 15. The torque of both shoes is then resisted by the anchor pin 11. The wedge block and housing 22 must, of course, move as a unit in order to transfer the braking force from one shoe to the other. When the brake drum is rotating in the opposite direction to arrow 35, then the reverse action occurs wherein the shoe 15 applies the load to the shoe 14 and of course the housing 22 moves circumferentially toward the right in Figure 1.

It is extremely important in a brake of this type that the adjusting device be returned to an exact neutral or central position so that neither of the brake shoes will drag against the drum. There is no difficulty in locating the anchored ends of the shoes because the anchor pin is fixed and each shoe can be drawn up against this fixed pin. However, the adjustable ends of the shoes must float so that extreme difficulty has been encountered in locating these ends of the shoes in an exact neutral position. In the ordinary automobile brake, a clearance only .006" is provided between the brake lining and the drum when the brakes are in their released position. The shoes must be held in a central position against all vibration and inertia forces so that they will not move this small distance into contact with the drum.

I have provided a novel device for so centralizing the adjustable ends of the brake shoes. This device comprises a hair-pin shaped spring 36 which has inturned ends 37 which are compressed in position between the ends of a slot 38 in the plate 27. The spring 36 is so stressed that it is normally urged outwardly to exert a substantial pressure on the ends of the slot 38. It will also be noted from Figure 3 that the ends of the slot 38 are vertically aligned with the inside edges of a pair of ears 40 which extend upwardly from the housing 22. When the housing 22 is in its central position, spring ends 37 extend between the ears 40 and into the slot 38 in the plate 27. The spring cannot fall out of this position because of the arm 28.

Figure 4 shows the operation of the device after the brake shoe 14 has impressed a load upon the wedge 23 greater than may be resisted by the spring 36. In this case the braking torque on shoe 14 is transferred through the shoe end 33 to the wedge block 23 from where it is applied to the ear 40 on the right-hand side of the housing. The right-hand ear 28 applies the load to the adjacent arm of the spring 36 to thereby further compress the spring and move the spring arm towards the left. The left-hand arm of the spring 36 cannot move circumferentially, due to its engagement with the ends of the slot 38 and, consequently, the spring 36 is compressed when the housing is moved by the shoe 14. This movement of the housing 22 is not resisted by the left-hand ear 40, as this ear simply moves away from the spring arm as the housing is shifted laterally.

When the brake pressure on the shoes is released, the right-hand arm of the spring 36 moves the housing back towards the center until the end of this arm strikes against the end of the slot 38. The housing is thus returned to its central position. The spring is initially compressed sufficiently that about 50 pounds pressure is required before the housing will be moved away from its central position. Consequently, the housing will be returned to its central position by a 50 pound spring pressure.

When the braking torque is applied from the opposite direction, the housing moves to the right, the function of the individual parts being reversed. Upon the release of the brake, the housing will be returned to its central and neutral position.

The unique feature of this construction is that the housing is returned from either of its extreme positions by a substantial spring pressure and that a relatively high pressure is required before the housing moves away from its central position, even to a slight amount.

Figure 6:
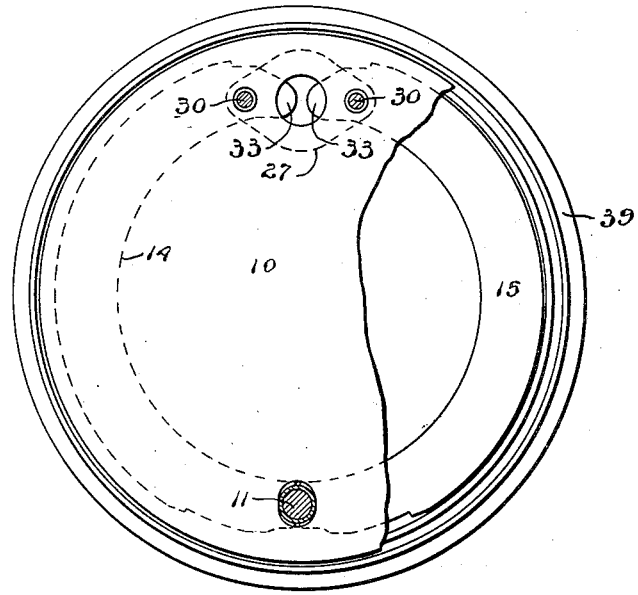
Figure 6 is a diagrammatic view of the shoe centering device, used in connection with this brake.
Figure 7:
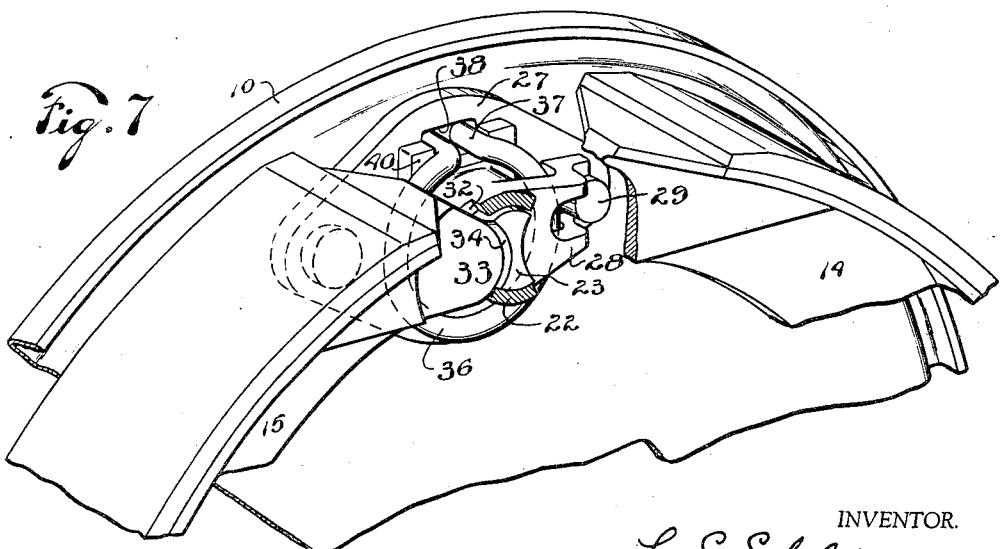
Figure 7 is a perspective view of the brake adjustment and shoe centering device which comprises my invention.

Referring to Figure 6, I have shown diagrammatically the means for centering the shoes in the drum. The anchor nut 12, together with the bolts 30, is loosened and the adjusting screw 24 tightened until the shoes engage the drum all around. Clearance is provided between the anchor plate and the bolts 30 so that centering will take place. The anchor stud may raise or lower until exact vertical alignment is secured, and the plate 27 may shift laterally to give lateral alignment. The bolts 30 and nut 12 are then tightened and the adjusting screw 24 backed off to provide the desired clearance.

Among the many advantages arising from the use of my improved construction, it may be well to mention that a fully energized brake for resisting rotation of the brake drum in either direction is provided and still the intermediate ends of the shoes are returned to an exact central position upon the release of the brakes.

Still further, the severe grabbing action usually associated with two-shoe fully energized brakes may be eliminated by causing an appreciable portion of the servo force to be expended in compressing a return spring instead of being applied to the primary shoe.

Some changes may be made in the arrangement, construction and combination of the various parts of my improved device without departing from the spirit of my invention, and it is my intention to cover by my claims such changes as may reasonably be included within the scope thereof.

I claim as my invention:

1. A vehicle brake comprising, a brake drum, a brake anchor plate mounted adjacent to said drum, a pair of brake shoes mounted upon said plate within said drum, means for spreading one pair of adjacent shoe ends to engage said shoes with said drum, a brake shoe centering device mounted upon said plate between the other pair of brake shoe ends, said centering device being movable relative to said plate circumferentially in both directions from a central position, said shoes coacting with said centering device to transfer torsional braking stresses from one of said shoes to the other of said shoes, and a spring having its ends coacting with the respective ends of aligned circumferential slots in said anchor plate and adjusting device, so that movement of said adjusting device in either direction from a central position will stress said spring between one edge of one of said slots and the opposite edge of the other of said slots.

2. A vehicle brake comprising, a brake drum, a brake anchor plate mounted adjacent to said drum, a pair of brake shoes mounted upon said plate within said drum, means for spreading one pair of adjacent shoe ends to engage said shoe with said drum, a brake shoe centering device mounted upon said plate between the other pair of shoe ends, said centering device being movable relative to said plate circumferentially in both directions from a central position, means for resiliently urging said shoes against the respective sides of said centering device, and a spring having its ends coacting with the respective ends of aligned circumferential slots in said anchor plate and adjusting device, said spring being under a substantial stress when in the above mentioned position, so that movement of said adjusting device in either direction from a central position will still further stress said spring between one edge of one of said slots and the opposite edge of the other of said slots.

3. A vehicle brake comprising, a brake drum, a brake anchor plate mounted adjacent to said drum, a pair of brake shoes mounted upon said plate within said drum, means for spreading one pair of adjacent shoe ends to engage said shoes with said drum, a brake shoe centering device mounted upon said plate between the other pair of brake shoe ends, said device being movable relative to said plate circumferentially in both directions from a central position, said other pair of brake shoe ends engaging said centering device and moving same circumferentially when one of said shoes applies a major torsional braking force to the other shoe, a spring resiliently holding said centering device in its central position against a minor but substantial torsional braking force from either of said shoes to the other shoe said spring having its ends extending into aligned slots in said anchor plate and adjusting device, respectively, so that movement of said adjusting device in either direction from said central position will compress said spring between one edge of one of said slots and the opposite edge of the other of said slots.

4. A vehicle brake comprising, a brake drum, a brake anchor plate mounted adjacent to said drum, a brake shoe anchor pin fixed to said plate at one point around its periphery, a pair of semicircular brake shoes mounted upon said plate within said drum, said shoes in their inoperative positions having one pair of adjacent shoe ends abutting the respective sides of said anchor pin, floating means for spreading said abutting shoe ends to engage said shoes with said drum, a brake shoe centering device mounted upon said plate between the other pair of brake shoe ends, said device movable relative to said plate circumferentially in both directions from a central position, the adjacent ends of said brake shoes abutting said device so as to transfer torsional brake stresses from one of said shoes to the other shoe, a torsional spring resiliently holding said device in said central position against a minor but substantial torsional braking the force from either of said brake shoes to the other, said spring having both of its ends extending into aligned slots in said anchor plate and said adjusting device, respectively, so that movement of said adjusting device in either direction from said central position will compress said spring between one edge of one of said slots and the opposite edge of the other of said slots.

5. A vehicle brake comprising, a brake drum, a brake anchor plate mounted adjacent to said drum, a brake shoe anchor pin fixed to said plate at one point around its periphery, a pair of semi-circular brake shoes mounted upon said plate within said drum, said shoes in their inoperative positions having one pair of adjacent shoe ends abutting the respective sides of said pin, floating means for spreading said abutting shoe ends to engage said shoes with said drum, a brake shoe adjusting and centering device mounted upon said plate between the other pair of brake shoe ends, said device being movable relative to said plate circumferentially in both directions from a central position, the adjacent ends of said shoes abutting said device so as to transfer torsional braking stresses from one of said shoes to the other, adjustable means associated with said device for spreading said adjacent shoe ends, a torsional spring resiliently holding said device in said central position against a minor but substantial torsional braking force from either of said shoes to the other, said torsional spring having both of its ends extending into aligned slots in said anchor plate and said adjusting device, respectively, so that movement of said adjusting device in either direction from its central position will compress said spring between one end of one of said slots and the opposite edge of the other of said slots.

6. A vehicle brake comprising, a brake drum, a brake anchor plate mounted adjacent to said drum, a brake shoe anchor pin fixed to said plate at one point around its periphery, a pair of semi-circular brake shoes mounted upon said plate within said drum, said shoes in their inoperative positions having one pair of adjacent shoe ends abutting the respective sides of said pin, floating means for spreading said shoe ends to apply said shoes to said drum, a brake shoe centering and adjusting housing mounted upon said plate between the other pair of brake shoe ends, an adjusting wedge disposed within said housing which coacts with the adjacent brake shoe ends to adjustably spread said shoes, said housing having a forked arm extending one side thereof, a pair of guide pins fixed to said anchor plate within said forked arm, which pins permit a limited circumferential movement of said housing in both directions from a central position, a pair of ears extending radially from said housing, said ears being aligned with a slot in said anchor plate, and a hairpin type spring extending around bracket between said pins, the arms of said spring being compressed so that its ends enter between said ears into said slot and exert a force outwardly against said ears and the ends of said slot, to thereby resiliently retain said housing in a central position, said spring being of such size that the application of a substantial torsional braking force from either of said shoes will fail to move said housing from said aligned position.

7. A vehicle brake comprising, a brake drum, a brake anchor plate mounted adjacent to said drum, a brake shoe anchor pin fixed to said plate at one point around its periphery, a pair of semi-circular brake shoes mounted upon said plate within said drum, said shoes in their inoperative positions having one pair of adjacent shoe ends abutting the respective sides of said anchor pin, floating means for spreading said adjacent shoe ends to apply said shoes to said drum, a brake shoe centering housing mounted upon said plate between the other pair of brake shoe ends, said housing extending through a relatively large opening in said plate, guide means permitting a limited circumferential movement of said housing on said anchor plate, a wedge block adjustably mounted in said housing so as to be operable from the rear of said anchor plate, said housing having a pair of openings therein through which the adjacent brake shoe ends extend so as to abut said wedge block, axial movement of said wedge block spreading said brake shoe ends to adjust same, a plate adjustably mounted upon said anchor plate adjacent to said housing, said plate having a circumferentially extending slot therein, a pair of ears extending from said housing in alignment with the ends of said slot, and a hairpin type spring extending around said housing having its ends bent laterally so as to enter said slot between said ears, said spring in the above position being compressed so as to exert a substantial pressure against said ears and the ends of said slot, whereby circumferential movement of said housing in either direction will further compress said spring by squeezing same between one of said ears and the opposite end of said slot.

8. A vehicle brake comprising, a brake drum, a brake anchor plate mounted adjacent to said drum, a pair of brake shoes mounted upon said anchor plate within said drum, means for spreading one pair of adjacent shoe ends to engage said shoes with said drum, a brake shoe centering device mounted upon said plate between the other pair of brake shoe ends, said device being movable relative to said device circumferentially in both directions from a central position, said other pair of brake shoe ends engaging said central device and moving same circumferentially when one of said shoes applies a major torsional braking force to the other of said shoes, said brake shoe centering device having a circumferentially extending slot therethrough and said brake anchor plate having a circumferentially extending slot therethrough aligned with said slot in said centering device, said slots being of substantially the same circumferential length, a torsional spring having both of its ends extending through both of said slots, said spring being at all times under compression, so that movement of said adjusting device in either direction from its central position will still further compress said spring between one edge of the slot in said brake anchor plate and the opposite edge of the slot in said centering device.

LAURENCE SPENCE SHELDRICK.